United States Patent [19]

Scrivo et al.

[11] 4,219,189
[45] Aug. 26, 1980

[54] SHOCK-ABSORBING ASSEMBLY

[75] Inventors: Jerry V. Scrivo; Peter A. Weller, both of Durham, N.H.

[73] Assignee: McCord Corporation, Detroit, Mich.

[21] Appl. No.: 6,076

[22] Filed: Jan. 24, 1979

[51] Int. Cl.³ .............................................. F16F 13/00
[52] U.S. Cl. ..................................... 267/8 R; 188/321; 267/33
[58] Field of Search ............... 188/321, 322; 267/8 R, 267/33, 34, 35, 64 R, 64 B, 116; 280/708, 709, 710, 712

[56] References Cited

U.S. PATENT DOCUMENTS

| | | | |
|---|---|---|---|
| 2,441,629 | 5/1948 | Hahn | 267/8 R |
| 3,160,407 | 12/1964 | Vaugoyeau | 267/35 |
| 3,953,010 | 4/1976 | Vos | 267/34 |

FOREIGN PATENT DOCUMENTS

| | | | |
|---|---|---|---|
| 1060723 | 7/1959 | Fed. Rep. of Germany | 267/8 R |
| 2658835 | 6/1978 | Fed. Rep. of Germany | 188/321 |
| 967859 | 8/1964 | United Kingdom | 267/8 R |
| 1238642 | 7/1971 | United Kingdom | 267/33 |

Primary Examiner—Edward R. Kazenske
Attorney, Agent, or Firm—McGlynn and Milton

[57] ABSTRACT

A spring support is disposed about and fixed to a shock-absorbing unit and engages the lower end of a coil spring. A spring base engages the upper end of the coil spring and engages a mounting plate which is secured to the vehicle body and is also fixedly connected to the upper end of the shock absorber rod. The spring base has a cup-shaped cavity in which is disposed an energy-absorbing block of compressible elastomeric urethane-type material for absorbing energy when the shock absorber system bottoms out by the upper end of the shock-absorbing unit engaging the bottom of the elastomeric block. The energy-absorbing block has a peripheral disc portion extending thereabout and clamped between a dust cover and the spring base for securing the block in position. The energy-absorbing block includes a first plate of non-compressible material disposed between its upper face and the bottom of the cup-shaped cavity in the spring base. A second plate is disposed on the bottom face of the energy-absorbing block with a sound-deadening material disposed thereon for compressing the energy-absorbing block upon bottoming out of the system when the cylindrical energy-absorbing unit engages the bottom plate of the energy-absorbing block to compress the block.

2 Claims, 2 Drawing Figures

SHOCK-ABSORBING ASSEMBLY

BACKGROUND OF THE INVENTION (1) Field of the Invention

The subject invention relates to a shock-absorbing assembly for use in a suspension system for a wheel of an automotive vehicle. Shock absorbers are utilized in automobiles to interconnect the wheel suspension assembly and the vehicle structure to absorb shocks as the wheels move in response to uneven terrain relative to the vehicle structure.

(2) Description of the Prior Art

Known assemblies include a shock assembly interconnecting the wheel and the vehicle structure with a rod in telescoping relationship with a shock-absorbing unit and attached to the vehicle structure with the shock-absorbing unit attached to the wheel assembly. In one such assembly, to which the instant invention relates, the shock-absorbing unit presents a shoulder surrounding the rod where the rod extends from the shock-absorbing unit with the other end of the rod attached to the vehicle structure. Additionally, an energy absorber is disposed about the upper end of the rod adjacent the vehicle structure to absorb energy in the event of a very severe shock where the shoulder on the shock absorber unit would approach the vehicle structure. Such an energy absorber has taken the form of a block of compressible material made of a plastic such as urethane or the like. The problem with the energy absorbers that have been utilized in such a system to date is that they have not been able to withstand rapid impacts at a variety of strains without significant deterioration over the life of the energy absorber. The energy absorbers known in the past have not always provided the desired combination of softness versus stiffness in proportion to the amount of compression or energy absorption of the energy-absorbing unit. Other problems which have been experienced are the cracking or tearing in the impact area of the energy absorber. In one unit a circular metal insert embedded within the energy absorber is set to react between the compressible material and the vehicle structure and surrounds the rod of the energy-absorbing unit but has a cylindrical portion disposed in spaced relationship to the rod whereby the energy-abosorbing material may be compressed sufficiently to be extruded through the annular space between the rod and the cylindrical portion of the insert.

SUMMARY OF THE INVENTION

The subject invention relates to an energy-absorbing block of compressible plastic material for use in such a shock-absorbing assembly of a vehicle suspension system wherein the block has oppositely disposed first and second faces with a passageway extending between the faces through which the rod of the shock absorber may extend and a peripheral disc portion extending radially of the passageway and adapted for connection to a support structure and with a first plate of incompressible material disposed on the first face and having an opening which is at least as small as the entry of the passageway into the first face and being circular with a bottom having the opening therein and a conical side wall extending from the bottom away from the face to a rim portion extending radially of the passageway from the conical side wall for reacting with the vehicle structure.

As a secondary feature a second plate is disposed upon the second face of the block of energy-absorbing material and has a periphery which extends radially outwardly of the periphery of the second face of the block for reacting with the shoulder on a shock-absorbing unit when it bottoms out to compress the block of material between the two plates.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
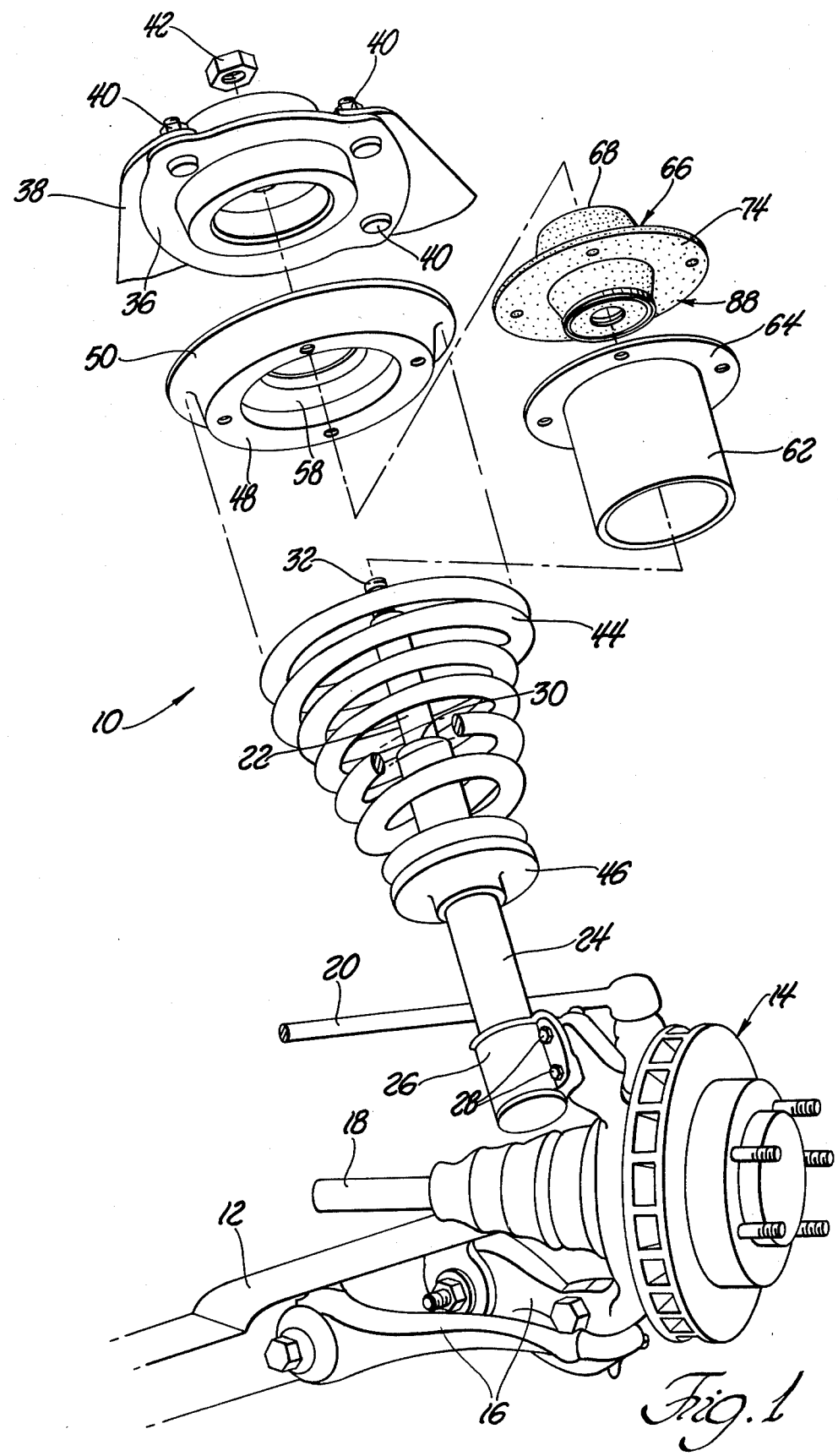
FIG. 1 is a fragmentary exploded perspective view of a suspension system in an automotive vehicle incorporating the features of the subject invention.
Figure 2:
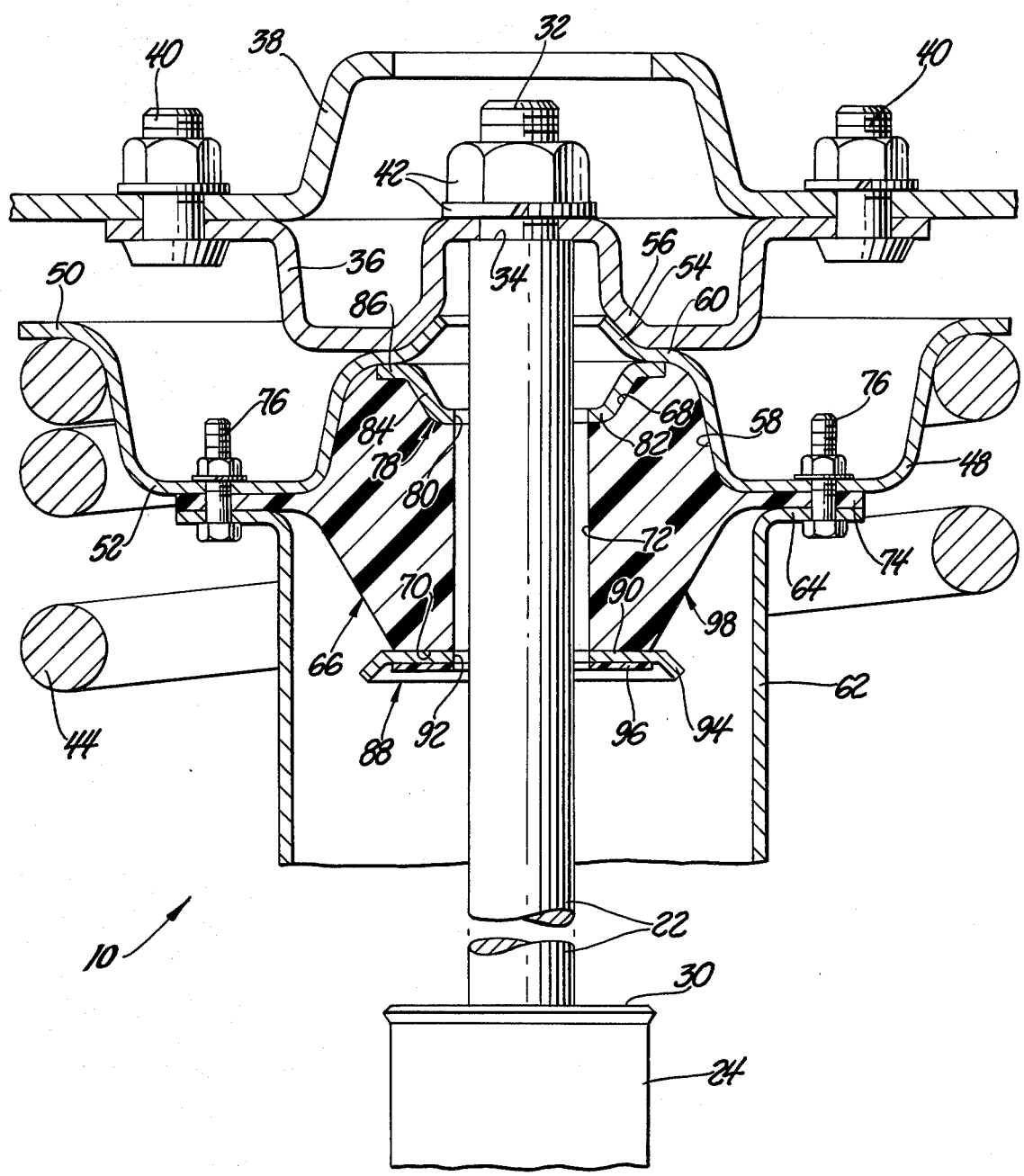
FIG. 2 is a fragmentary cross-sectional view illustrating the components of the subject invention.

A shock-absorbing assembly for use in a suspension system in an automotive vehicle is generally shown at 10 in FIGS. 1 and 2.

The shock-absorbing assembly 10 is shown in combination with the front wheel drive assembly of an automotive vehicle. Specifically, the front wheel drive includes a frame member 12 with a front wheel assembly generally indicated at 14 supported by the arms 16 for vertical movement relative to the vehicle frame member 12. An axle 18 is operatively connected to the wheel assembly 14 for rotating the front wheel of the automobile for powering the automobile. A steering rod 20 is connected to the wheel assembly 14 for steering the vehicle.

The assembly 10 includes a shock absorber having a rod 22 and a cylindrical shock-absorbing unit 24. The rod 22 is disposed in telescoping relationship with the shock-absorbing unit 24 whereby shocks are absorbed as the rod 22 telescopes into the shock-absorbing unit 24. The cylindrical shock-absorbing unit 24 is adapted for attachment to the wheel assembly 14 through a bracket 26 which is secured to the cylindrical shock-absorbing unit 24 at the bottom or first end thereof and is bolted by the bolts 28 to the wheel assembly 14. The shock-absorbing unit 24 has a shoulder 30 surrounding the rod 22 at the second end thereof. The rod 22 extends out of the shock-absorbing unit 24 to a distal end 32. The distal end 32 has a reduced threaded portion extending from a shoulder 34.

A mounting plate 36 is attached to the structure 38 of the vehicle by way of bolts 40. The mounting plate 36 has a hole extending through the central portion thereof through which the threaded portion of the distal end 32 of the rod 22 extends with the shoulder 34 of the rod abutting the bottom face of the mounting plate 36. A nut and washer assembly 42 is disposed upon the distal end 32 of the rod 22 for fixedly connecting the rod 22 to the mounting plate 36 whereby the rod 22 is anchored to the support structure 38 of the vehicle.

A helical coil spring 44 is disposed about and surrounds the shock-absorbing unit 24 and the rod 22. A spring support 46 is disposed about and fixed to the shock-absorbing unit 24 midway along its length and engages a first or bottom end of the spring 44. The spring support member 46 may be welded or otherwise secured to the shock-absorbing unit 24 and supports the coil spring 44. A spring base 48 is disposed about the rod 22 adjacent the distal end 32 thereof and engages the second or upper end of the spring 44. The spring base 48 includes an annular flange 50 for engaging the upper turns of the spring 44 and an annular depressed portion 52 with a central raised portion defining a male conical portion 54 which engages a female conical portion 56 defined by the mounting plate 36. The mating conical portions 54 and 56 prevent lateral movement of the spring base 50. Said another way, the spring base 48 has a cup-shaped cavity 58 surrounding the rod 22 with the rod 22 extending through the bottom 60 of the cup-shaped cavity 58. The cup-shaped cavity 58 opens toward the shoulder 30 of the energy-absorbing unit 24. The spring base member 48 is engaged with and urged against the mounting plate 36 by the spring 44.

Also included is a cylindrical dust cover 62 having a peripheral flange 64. The cylindrical dust cover 62 extends from the spring base member 48 about the rod 22 and within the spring 44.

The assembly includes an energy-absorbing means comprising an energy-absorbing block of compressible material such as plastic, rubber, or the like, and generally indicated at 66. Preferably the energy-absorbing block 66 is made of a urethane or foam material. The energy-absorbing block 66 is disposed about the rod 22 and is disposed in and tightly fits within the cup-shaped cavity 58 of the spring base member 48.

The block 66 has a first face 68 facing the spring base member 48 and a second face 70 facing the shoulder 30 of the energy-absorbing unit 24. The faces 68 and 70 are oppositely disposed and a passageway 72 extends between the first and second faces 68 and 70.

The block 66 has a peripheral disc portion 74 extending radially of the passageway 72 and clamped between the portion 52 of the spring base member 48 and the annular flange 64 of the dust cover by the bolts 76 which extend through holes in the flange 64 of the dust cover and the disc portion 74 of the block 66 and the portion 52 of the spring base member 48.

A first plate generally indicated at 78 is disposed on the first face 68 of the block 66 and has an opening 80 therethrough through which the rod 22 extends. The plate 78 is of an incompressible material, such as metal or the like, so as not to deform in reaction to forces compressing the block 66. The opening 80 in the plate 78 is at least as small as the entry of the passageway 72 into the first face 68 of the block 66. In other words, the passageway 72 is circular as is the opening 80 in the plate 78, however, the diameter of the opening 80 in the plate is no larger than the diameter of the passageway 72. Such prevents and inhibits the extrusion of the plastic material of the block 66 past the plate 78.

The first plate 78 is circular with a bottom 82 having the opening 80 therein with a conical side wall 84 extending from the bottom away from the face 68 and toward the bottom 60 of the cup-shaped cavity 58 and a rim portion 86 extending radially of the rod 22 from the conical side wall 84. The rim portion 86 is in engagement with the bottom 60 of the cup-shaped cavity 58 in the spring base member 48. The plate 78 is embedded within the block 66.

A second plate generally indicated at 88 is disposed on the second face 70 of the block 66. The second plate 88 is dish-shaped with a circular base 90 having an opening 92 disposed about the rod 22. The opening 92 has a periphery at least as small as the entry of the passageway 72 into the second face 70 of the block 66.

Again, the opening 92 is circular as is the passageway 72 and the diameter of the opening 92 is not larger than the diameter of the opening 72 to prevent extrusion of the plastic material of the block 66 through the opening 92. The plate 88 has a conical flange 94 extending from the periphery of the circular base 90 in a direction away from the second face 70 of the block 66. The circular base 90 of the second plate 88 has a periphery disposed radially of the rod 22 beyond or outwardly of the periphery of the second face 70 of the block. In other words, the extremity of the plate 88 is outwardly of the face 70 to prevent extrusion or shearing or tearing of the block 66 by the plate 88 upon compression of the material of the block 66.

There is also included sound-deadening means 96 disposed over the plate 88 in the circular base thereof for inhibiting sound upon engagement of the shoulder 30 with the plate 88. The sound-deadening material may take the form of a plastic coating, a plastic disc or other suitable materials.

The block 66 has a conical exterior generally indicated at 98 and extends radially outwardly or is flared radially outwardly of the axis of the rod 22 from the plate 88 in a direction toward the peripheral disc portion 74 of the block 66. The block 66 also includes a circular exterior extending from the peripheral disc portion 74 upwardly to the first face 68 thereof, which also may be said to be conical but oppositely disposed and with the exterior walls being at a steeper angle.

OPERATION OF PREFERRED EMBODIMENT

In the event a vehicle, in which the system illustrated in FIG. 1 is installed, engages rough road, the wheel assembly 14 will move upwardly in response to that rough road and telescope the rod 22 into the shock-absorbing unit 24 with that movement being resisted by the shock-absorbing unit 24 and the spring 44. However, should a very severe shock occur, the shock-absorbing unit 24 may move up upon the rod 22 sufficiently that the shoulder 30 could engage the vehicle structure, but to prevent such the shock-absorbing block 66 is disposed adjacent the vehicle structure. Should such a severe shock occur the shoulder 30 would engage the plate 88 through the sound-deadening material 96 to compress the elastomeric block 66 against the plate 78 which engages the bottom 60 of the cavity 58 in the spring base member 48. The material of the block 66 is such that it is soft upon initial compression but becomes more stiff in proportion to the amount of compression. In other words, there is no sudden or abrupt stop or change in velocity of movement when the shoulder 30 begins to compress the block 66, i.e., a smooth transition. As the block 66 is compressed the material bulges outwardly, i.e., the conical exterior 98 bulges as the block 66 compresses. Due to the configuration of the plate 78 and 88, the material of the block 66 compresses without being extruded past either of the plates or without either of the plates tearing or shearing the material of the block 66. The sound-deadening material 96 eliminates a clicking sound in the event the shoulder 30 of the shock-absorbing unit 24 continually engages the plate 88, particularly, if the plate 88 is made of metal and the shoulder 30 is also made of metal.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A shock-absorbing assembly for use in a suspension system for an automotive vehicle comprising: a shock absorber including a rod and a cylindrical shock-absorbing unit; said rod being disposed in telescoping relationship with said shock-absorbing unit; said shock-absorbing unit being adapted for attachment to a wheel assembly at a first end thereof and having a shoulder surrounding said rod at a second end thereof; said rod extending out of said shock-absorbing unit to a distal end; a mounting plate adapted for attachment to the structure of a vehicle and fixedly connected to said distal end of said rod for anchoring said rod to the structure of a vehicle; a spring surrounding said shock-absorbing unit and said rod; a spring support disposed about and fixed to said shock absorbing unit and engaging a first end of said spring; a spring base disposed about said rod adjacent said distal end thereof and engaging the second end of said spring; said spring base being in engagement with and urged against said mounting plate by said spring; a cylindrical dust cover extending from said spring base about said rod and within said spring; said spring base having a cup-shaped cavity surrounding said rod with said rod extending through the bottom of said cup-shaped cavity and with said cup-shaped cavity opening toward said shoulder of said shock-absorbing unit; and energy-absorbing means including an energy-absorbing block of compressible material disposed about said rod and in said cup-shaped cavity, said block having a first face facing said spring base and a second face facing said shoulder of said shock-absorbing unit, said block having a peripheral disc portion extending radially and clamped between said spring base and said dust cover, said block having a passageway extending between said first and second faces through which said rod extends, a first plate of incompressible material disposed on said first face of said block and having an opening therethrough through which said rod extends, said opening in said first plate being at least as small as the entry of said passageway into said first face of said block, said first plate being circular with a bottom having said opening therein and a conical side wall extending from said bottom away from said first face and toward said bottom of said cup-shaped cavity in said spring base with a rim portion extending radially of said rod from said conical side wall, said rim portion being in engagement with said bottom of said cup-shaped cavity in said spring base, a second plate disposed on said second face of said block, said second plate being dish-shaped with a circular base having an opening disposed about said rod with the periphery of said opening in said circular base being at least as small as the entry of said passageway into said second face of said block, said second plate having a conical flange extending from the periphery of said circular base thereof in a direction away from said second face of said block, said circular base of said second plate having a periphery disposed radially of said rod beyond the periphery of said second face of said block, sound-deadening means disposed over said second plate for inhibiting sound upon engagement of said shoulder of said shock-absorbing unit with said second plate, said block having a conical exterior and extending radially outwardly of said rod from said second plate to said peripheral disc portion of said block.

2. An energy-absorbing block of compressible material for use in a shock-absorbing assembly of a vehicle suspension system and comprising; oppositely disposed first and second faces with a passageway extending between said faces, a peripheral disc portion extending radially of said passageway and adapted to be connected to support structure, a first plate of imcompressible material disposed on said first face and having an opening therethrough which is at least as small as the entry of said passageway into said first face, said first plate being circular with a bottom having said opening therein and a conical side wall extending from said bottom away from said first face with a rim portion extending radially of said passageway from said conical side wall, a second plate disposed on said second face, said second plate having a periphery which extends radially outwardly from said passageway farther than the periphery of said second face, said block including a conical exterior extending radially outwardly of said passageway from said second plate to said peripheral disc portion thereof, said second plate being dish-shaped with a circular base having an opening with a periphery at least as small as the entry of said passageway into said second face, said second plate having a conical flange extending from the periphery of said circular base in a direction away from said second face, said block including a circular exterior extending from said peripheral disc portion to said first face thereof, and sound-deadening means disposed over said second plate for inhibiting sound.

* * * * *